United States Patent Office 3,337,524
Patented Aug. 22, 1967

---

3,337,524
MONOAZO COMPOUNDS CONTAINING A DIHYDROXYPHENYL GROUP AND A 2-AMINO-8-NAPHTHOL GROUP
Milton Green, Newton Center, and Terry W. Milligan, Belmont, Mass., and Daniel L. Ross, Princeton, N.J., assignors to Polaroid Corporation, Cambridge, Mass., a corporation of Delaware
No Drawing. Filed June 14, 1965, Ser. No. 463,862
8 Claims. (Cl. 260—198)

This invention relates to photography and, more particularly, to novel chemical compounds which are useful in products, compositions and processes for the development of photosensitive silver halide elements.

This application is a continuation-in-part of application Ser. No. 174,248, filed Feb. 19, 1962, now U.S. Patent No. 3,241,963.

One object of this invention is to provide novel chemical compounds and novel syntheses for the preparation thereof.

Another object is to provide novel chemical compounds useful in photographic products, processes and compositions in which colored developing agents are used.

Other objects of the invention will in part be obvious and will in part appear hereinafter.

The invention accordingly comprises the processes involving the several steps and the relation and order of one or more of such steps with respect to each of the others, and the products and compositions possessing the features, properties and the relation of elements which are exemplified in the following detailed disclosure, and the scope of the application of which will be indicated in the claims.

U.S. Patent No. 2,983,606, issued May 9, 1961 to Howard G. Rogers, discloses diffusion transfer processes wherein a photographic negative material, such as a photographic element comprising an exposed silver halide emulsion, is developed in the presence of a dye developer to impart to an image-receiving layer a reversed or positive dye image of the developed image by permeating into said emulsion a suitable liquid processing composition and bringing said emulsion into superposed relationship with an appropriate image-receiving layer.

The inventive concepts herein set forth relate to novel dye developers for use in such processes.

The dye developers of this invention are azo dyes having the formula:

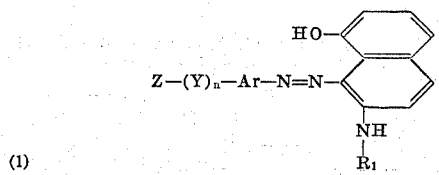

(1)

wherein Z is an ortho- or para-dihydroxyphenyl radical, Y is a lower alkylene radical, such as methylene, ethylene or isopropylene, a carboxamido or a lower alkylenecarboxamido radical, $n$ is 0 or 1, Ar is a phenyl or naphthyl radical and $R_1$ is hydrogen, an alkyl radical, preferably a lower alkyl radical, or a substituted alkyl, for example, hydroxyalkyl. It should be understood that the term "alkylenecarboxamido" is intended to include radicals wherein the alkylene group is branched, e.g.,

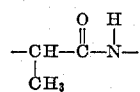

and wherein the carboxamido group is substituted, e.g.,

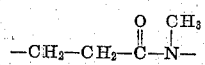

and combinations of radicals of both types. Alkyl is also intended to include a branched as well as a straight chain, e.g.,

In a preferred embodiment, Z is a para-dihydroxyphenyl radical, and Ar is a phenyl radical. Such compounds may be represented by the formula:

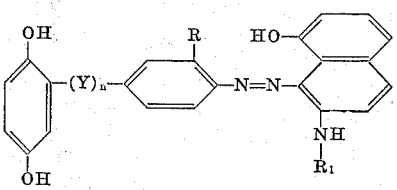

(2)

wherein Y, $n$ and $R_1$ have the same meaning as above and R is hydrogen or a halogen, methoxyl, methyl, or trifluoromethyl radical.

The dye developers of this invention may be prepared by coupling, in the 8-position, a 7-amino-1-naphthol coupler with a diazonium salt of an arylamine containing a silver halide developing radical. The dye developers prepared from this coupler exhibit an unexpected increase in light stability.

The dye developers of this invention wherein Ar is a naphthyl radical, or a phenyl radical, wherein R, the substituent ortho to the azo group, is a halogen, methoxyl, methyl or trifluoromethyl group and $R_1$ is hydrogen, are also found to possess unexpected nondesensitizing properties in addition to the above-mentioned light stability properties. Because of these nondesensitizing properties, it is possible to incorporate such dye developers directly into the emulsion without any accompanying silver halide desensitization that would normally be expected to occur in compounds of this type. With the dye developers of this invention, the displacement of the optical sensitizing dyes on the silver halide grain is substantially decreased, thereby increasing the efficiency of the sensitizing agents.

Nondesensitizing properties are also found in compounds within Formula 2 wherein R is hydrogen and $R_1$ is an alkyl radical. By using the substituted amino-naphthol coupler, a greater choice of amine functions is available for coupling, thereby resulting in increased flexibility with regard to the synthesis of dye developers having desired color characteristics.

Substituted amino-naphthol couplers and their preparation are disclosed and claimed in the copending application of Daniel L. Ross, Ser. No. 174,247, filed Feb. 19, 1962, now U.S. Patent No. 3,194,838.

It should be understood that the group designated Ar may be substituted in positions other than the ortho position by, for example, halogen, lower alkyl and alkoxy radicals.

The ortho- or para-dihydroxyphenyl radical may also be substituted by, for example, alkyl and halogen substituents.

Certain of the dye developers of the present invention are subgeneric to certain specific classes of dye developers disclosed in the copending application of Elkan R. Blout, Saul G. Cohen, Milton Green, Howard G. Rogers, Myron S. Simon and Robert B. Woodward, Ser. No. 1,443, filed Jan. 11, 1960, U.S. Patent No. 3,134,672, issued May 26, 1964 to Elkan R. Blout, Milton Green and Howard G. Rogers, and the copending application of Myron S. Simon, Ser. No. 196,523, filed May 21, 1962, and now U.S. Patent No. 3,183,089 as a continuation-in-part of Ser. No. 612,053, filed Sept. 25, 1956, and now abandoned. The dye developers of the present invention are distinguishable by the above-described, unobvious and unexpected properties that render them photographically superior to those set forth in the above-designated copending applications.

In addition, the dye developers disclosed herein exhibit a substantial increase in pH stability over the isomeric amino-naphthol dye developers of the above patent and copending application, that is, they are not subject to color change due to a change in pH. This property is highly desirable in the photographic employment of the dye developers of the present invention.

The dyes of Formula 1 may be prepared by diazotizing a compound of the formula:

(3)        $Z_1—(Y)_n—Ar—NH_2$ wherein Y, n and Ar have the same significance as previously noted; and $Z_1$ represents the protected derivative of the ortho- or para-dihydroxyphenyl group, preferably the O-acylated derivative; coupling the diazotized compound into the desired 7-amino-1-naphthol coupler wherein the hydroxyl group of the coupler is also protected, e.g., by acylation; and removing the protective groups prior to the photographic utilization of the compounds. Hydrolysis in the presence of alkali, for example, may be employed to remove the protecting groups.

The novel dye developers of this invention may also be prepared by coupling a diamine into the amino-naphthol coupler and adding the developer group as the lactone through amide condensation according to the method disclosed in the above-mentioned copending application Ser. No. 1,443.

The compounds of Formula 1 may also be prepared by reacting a 1,7-dihydroxynaphthalene with an amine of the formula:

(4)        $R_1—NH_2$ wherein $R_1$ has the same meaning as above, protecting the hydroxyl group of the coupler, coupling the resulting product with a diazotized compound of Formula 3, and removing the protective groups prior to photographic employment.

In addition to forming azo couplers for use in this invention by reacting a dihydroxynaphthalene with an amine, a two-step reaction of 7-hydroxy-1-naphthalene sulfonic acid with an amine and ammonium bisulfite, followed by potassium hydroxide fusion, may also be used to produce azo couplers for this invention.

In addition to protecting the hydroxyl groups on the dihydroxyphenyl radicals, it should be noted that it is desirable to protect the hydroxyl groups on the amino-naphthol coupler, during synthesis, as by acylation, to avoid side reactions and to insure coupling in the desired position. If protecting groups were not so employed, the position of coupling could not be controlled and an undesirable mixture of dyes of varying structure would result instead of compounds as shown by Formula 1.

As examples of dye developers within the scope of this invention, mention may be made of:

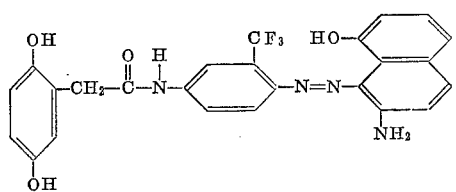

(I) 8-(4'-homogentisamido-2'-trifluoromethyl)-phenylazo-7-amino-1-naphthol

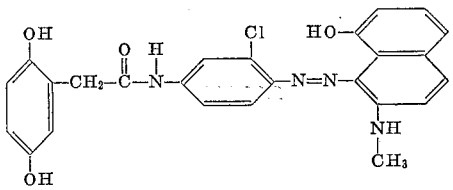

(II) 8-(4'-homogentisamido-2'-chloro)-phenylazo-7-methylamino-1-naphthol

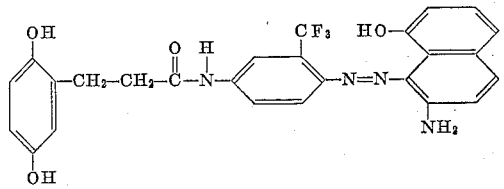

(III) 1-[2'-trifluoromethyl-4'-(2'',5''-dihydroxyphenyl)-propionamido]-phenylazo-8-hydroxy-2-naphthylamine

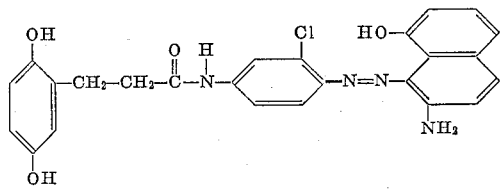

(IV) 1-[2'-chloro-4'-(2'',5''-dihydroxyphenyl)-propionamido]-phenylazo-8-hydroxy-2-naphthylamine

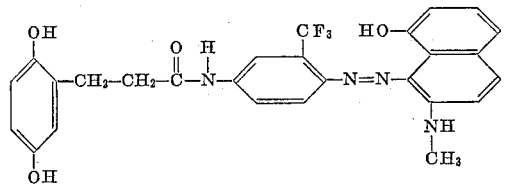

(V) 1-[2'-trifluoromethyl-4'-(2'',5''-dihydroxyphenyl)-propionamido]-phenylazo-2-methylamino-8-naphthol

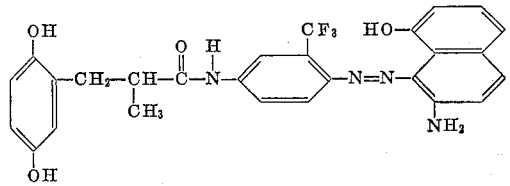

(VI) 1-[4'-(2'',5''-dihydroxyphenylisobutyramido)-2'-trifluoromethyl]-phenylazo-8-hydroxy-2-naphthylamine

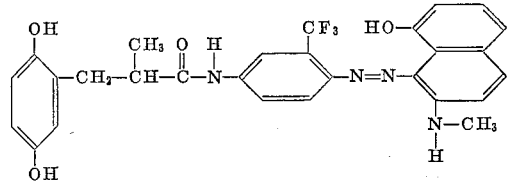

(VII) 1-[2'-trifluoromethyl-4'-(2'',5''-dihydroxyphenyl)-isobutyramido]-phenylazo-2-methylamino-8-naphthol

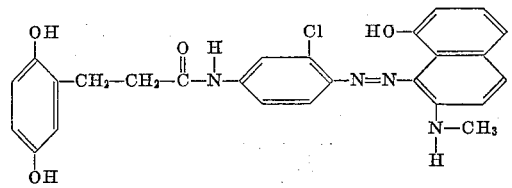

(VIII) 1-[2'-chloro-4'-(2'',5''-dihydroxyphenyl)-propionamido]-phenylazo-8-hydroxy-2-N-methylnaphthylamine

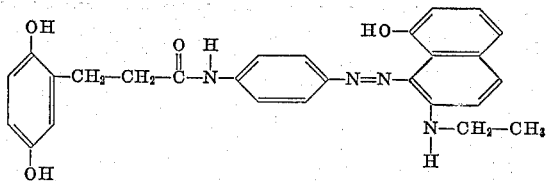

(IX) 1-[4'-(2'',5''-dihydroxyphenyl)-propionamido]-phenyl-azo-2-ethylamino-8-naphthol

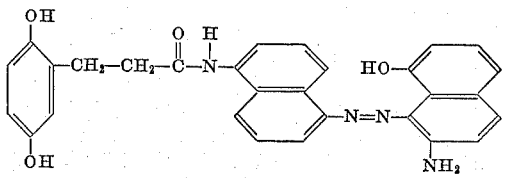

(X) 1-[5'-(2'',5''-dihydroxyphenyl)-propionamido]-α-naphthylazo-2-amino-8-naphthol

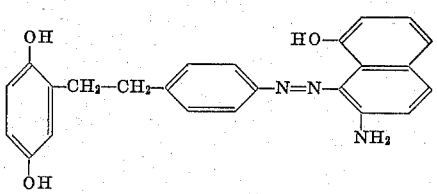

(XI) 1-[4'-(2'',5''-dihydroxyphenethyl)]-phenylazo-2-amino-8-naphthol

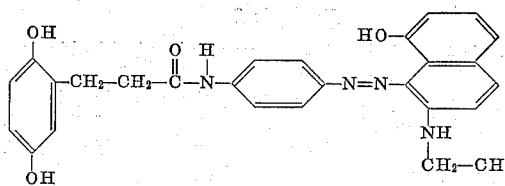

(XII) 1-[4'-(2'',5''-dihydroxyphenyl)-propionamido]-phenyl-azo-8-hydroxy-2-(N-β-hydroxyethyl)-naphthylamine

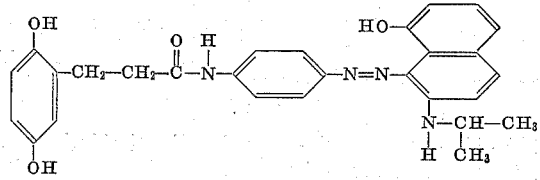

(XIII) 1-[4'-(2'',5''-dihydroxyphenyl)-propionamido]-phenylazo-2-isopropylamino-8-naphthol

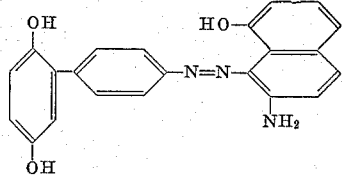

(XIV) 1-[4'-(2'',5''-dihydroxyphenyl)]-phenylazo-8-hydroxy-2-naphthylamine

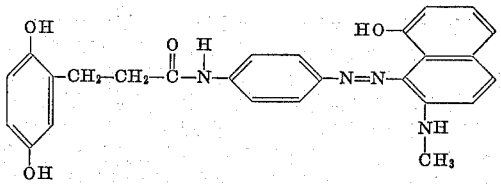

(XV) 1-[4'-(2'',5''-dihydroxyphenyl)-propionamido]-phenylazo-2-methylamino-8-naphthol

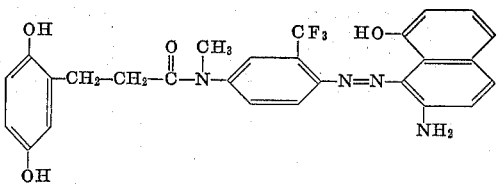

(XVI) 1-[4'-(2'',5''-dihydroxyphenyl - N - methyl - propion-amido) - 2' - trifluoromethyl] - phenylazo - 8 - hydroxy-2-naphthylamine The following nonlimiting examples illustrate the preparation of intermediates within the scope of this invention:

Example A

A solution of 4.78 gm. (0.03 mole) of 8-hydroxy-2-naphthylamine in 50 ml. of acetic acid previously saturated with hydrogen chloride gas was placed in a 100 ml. flask equipped with a heating mantle, a thermometer, a mechanical stirrer, a pressure equalizing addition funnel open at the top, and a tube for introducing hydrogen chloride gas below the surface of the mixture. Dry hydrogen chloride gas was bubbled into the stirred mixture for 30 minutes. 10 ml. of acetyl chloride were then added. The additional funnel was then replaced with a reflux condenser. Stirring and the addition of hydrogen chloride gas was continued while the flask was heated to raise the temperature to 40° C. and maintained at 40–45° C. for 45 minutes. After that time, heating was discontinued while stirring was continued for another 15 minutes. The mixture was then diluted with 100 ml. of ether. The pale gray precipitate was collected by suction filtration and washed free of HCl and acetic acid with dry ether. 5.88 gm. of acetoxy-2-naphthylamine hydrochloride, melting at 184.5–185° C., were produced.

Analysis of the product shows: Calculated: C, 60.63; H, 5.09; N, 5.89. Found: C, 59.74; H, 4.96; N, 5.37.

Example B

A mixture of 5.26 gm. of:

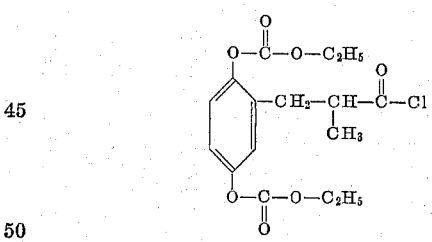

2,5-bis-(cathyloxy)-α-methyl-dihydrocinnamoyl chloride (B.P. 180–185° C., at 0.7 mm. Hg) and 3.01 gm. of 2-nitro-5-amino-benzotrifluoride in 65 ml. of dry chlorobenzene were heated at reflux for 1.5 hours, after which time it was cooled and diluted with 300 ml. of hexane. The oil which separated was decanted and washed with hexane. The oil was then dissolved in 100 ml. of ethanol and hydrogenated in a Parr shaker with 0.5 gm. of 10% palladium-barium sulfate catalyst. Hydrogen uptake stopped at 82% of theoretical in less than 1 hour. The solution was filtered directly into 100 ml. of 6 N HCl and the resulting acidic solution was concentrated under reduced pressure to a volume of 150 ml. in the cold. After chilling overnight in a refrigerator, a white crystalline product appeared. The product was collected and washed with a small amount of ice water. The 4-[2',5'-bis-cathyloxy)-phenyl]-isobnutyramido-2-trifluoromethylaniline hydrochloride weighed 4.9 gm. and melted at 151.5–153° C.

Analysis of the product shows: Calculated: C, 51.65; H, 4.90; N, 5.24; Cl, 6.63. Found: C, 51.78; H, 4.93; N, 5.16; Cl, 6.91.

Example C 40 gm. of 1,7-dihydroxynaphthalene, 43.5 cc. of 40% aqueous methylamine and 50 cc. of water were placed in a 200 cc. fusion bomb. The bomb was heated and rocked at 150° C. for 8 hours. The contents of the bomb were poured into a 1 liter beaker and 100 cc. of 50% sodium hydroxide and 300 cc. of water were added. After stirring, Celite was added and the mixture was filtered through a sintered glass funnel. 200 ml. of concentrated hydrochloric acid were added to the filtrate with stirring. The solution was cooled to room temperature and filtered through a sintered glass funnel. The solid was stirred with 50 cc. of water and again filtered. The filtrates were collected and ammonium carbonate was added with stirring until no further white solid precipitated. The solid was separated and stirred with 200 cc. of water. The product was again collected and dried in a vacuum dessicator. The 2-methylamino-8-naphthol was a light gray powder and melted at 123–126° C. with decomposition.

7.28 gm. of 2-methylamino-8-naphthol and 72 cc. of acetic acid saturated with hydrogen chloride were placed in a 3-necked round-bottom flask fitted with magnetic stirrer, gas inlet tube, dropping tube, drying tube and thermometer. Hydrogen chloride gas was bubbled through the solution for 30 minutes. With the hydrogen chloride gas still being bubbled in, 145 cc. of acetyl chloride were added. The solution was then heated to 45–55° C. and maintained at that temperature for 1¾ hours. The solution was then poured slowly and with stirring into 1 liter of anhydrous ether. The resulting precipitate, 8-acetoxy-N-methyl-2-naphthylamine hydrochloride, was collected, washed with ether and dried in the vacuum dessicator. The product melted at 153–156° C. with decomposition.

Example D 40 gm. of 1,7-dihydroxynaphthalene, 14.78 gm. of isopropylamine, 25 gm. of ethanol and 75 cc. of water were placed in a 200 cc. fusion bomb. The bomb was heated to 180° C. and rocked for 8 hours. The contents were then removed, cooled to room temperature and mixed with 300 cc. of water and 500 cc. of 50% sodium hydroxide. Celite was added and the solution was filtered. 250 cc. of concentrated hydrochloric acid were added to the filtrate. After cooling the solution, the resulting aqueous layer was discarded. 500 cc. of 5% hydrochloric acid were added to the oily phase, heated and filtered. On cooling, a layer separated and solidified. The aqueous layer was neutralized with ammonium carbonate. The resulting thick gum was taken up in 110 cc. of hot 5% hydrochloric acid. Upon cooling, white crystals of 8-hydroxy-2-N-isopropylnaphthylamine hydrochloride separated. Additional product was also obtained by extracting the above-solidified layer with two portions of ethyl acetate. The residue was then recrystallized from 250 ml. of hot 5% hydrochloric acid to give additional amine hydrochloride. The product melted at 196–200° C. with decomposition.

8.65 gm. of 8-hydroxy-2-N-isopropylnaphthylamine hydrochloride and 83 cc. of acetic acid saturated with hydrogen chloride were placed in a 250 cc., 3-necked rounded-bottom flask fitted with magnetic stirrer, thermometer, reflex condenser, drying tube, and gas inlet tube. Hydrogen chloride gas was bubbled into the solution for 30 minutes, and, with the admission of the gas continued, 12.6 cc. of acetyl chloride were added. The solution was heated to 45–55° C. and maintained at that temperature for 1¾ hours. The solution was then poured slowly and with stirring into 1 liter of anhydrous ether. The resulting solid, 8-acetoxy-2-N-isopropylnaphthylamine hydrochloride, was separated, washed with ether and dried in the vacuum dessicator.

The following nonlimiting examples illustrate the separation of dye developers within the scope of this invention:

Example 1

5.35 gm. (0.01 mole) of 4-[2′,5′-bis-(cathyloxy)-phenyl]-isobutyramido-2-trifluoromethyl aniline hydrochloride (prepared by the method of Example B) were diazotized in a mixture of 20 ml. of 6 N hydrochloric acid, 60 ml. of acetic acid, with aqueous $NaNO_2$ and ice for 30 minutes. The resulting diazo solution was poured into a solution of 2.38 gm. of 8-acetoxy-2-naphthylamine hydrochloride as prepared in Example A in 150 ml. of 80% acetic acid at 15° C. Saturated sodium acetate solution was added in small portions to raise the pH to about 4, whereupon coupling proceeds rapidly. After stirring for one hour at 15–20° C., the mixture was diluted slowly with 350 ml. of water. The resulting sticky precipitate was separated, washed with water and then dissolved in 300 ml. of methyl Cellosolve for hydrolysis. The solution was placed in a 2 liter flask equipped with a stirrer, two dropping funnels, and a tube to pass nitrogen through the solution. After flushing the apparatus and solution with a rapid stream of nitrogen, a deaerated solution of sodium hydroxide (10 ml. of 50% NaOH) plus 90 ml. of water was run in. The solution, stirred for 30 minutes under nitrogen, turned from orange-brown to magenta. The solution was then acidified with a deaerated solution of 50 ml. of concentrated hydrochloric acid in 450 ml. of water. The precipitated dye was collected on a suction filter and washed with water. It was purified by dissolving in 250 ml. of methyl Cellosolve, filtering and then precipitated with 500 ml. of water containing a trace of hydrochloric acid. After drying at 70° C., the 4.1 gm. of 1-[4′-(2″,5″-dihydroxyphenylisobutyramido) - 2′ - trifluoromethyl]-phenylazo-8-hydroxy-2-naphthylamine (Formula VI) produced melted at 144–146° C.

*Analysis.*—Calculated: C, 59.77; H, 4.64; N, 10.35. Found: C, 59.70; H, 4.62; N, 10.33.

Example 2

2,5 - bis - (cathyloxy) - phenylpropionyl chloride was reacted with 2-nitro-5-amino-benzotrifluoride and the product hydrogenated according to the procedure in Example B. The resulting 2-trifluoromethyl-4-(2,5-dicathyloxyphenyl)-propionamido-aniline hydrochloride (M.P. 169–173° C.) was diazotized and coupled according to the procedure in Example 1 with 8-acetoxy-2-naphthylamine hydrochloride, prepared as in Example A. The hydrolyzed product, 1-[2′-trifluoromethyl-4′-(2″,5″-dihydroxyphenyl) - propionamido] - phenylazo - 8 - hydroxy-2-naphthylamine (Formula III), melted at 166–168° C. with decomposition and showed the following analysis:

Calculated: C, 59.08; H, 4.39. Found: C, 59.77; H, 4.24.

Example 3

2,5 - bis - (cathyloxy) - phenylpropionyl chloride was reacted with 3-chloro-4-nitroaniline (J. Phys. Chem. [2], 102) and hydrogenated according to the procedure in Example B. The resulting 2-chloro-4-(2,5-bis-cathyloxyphenyl)-propionamido-aniline hydrochloride melted at 186–187° C. and showed the following analysis:

Calculated: C, 51.8; H, 4.9; Cl, 14.6; N, 5.75. Found: C, 51.9; H, 5.1; Cl, 14.3; N, 5.9. The above product was then diazotized and coupled according to the procedure in Example 1 with 8-acetoxy-2-naphthylamine hydrochloride. The hydrolyzed product, 1-[2′-chloro-4′(2″,5″-dihydroxyphenyl) - propionamido] - phenylazo - 8 - hydroxy-2-naphthylamine (Formula IV) melted at 160–165° C. with decomposition.

Example 4

2,5-bis-carbethoxy-homogentisic chloride was reacted, according to the method of Example B, with 2-nitro-5-amino-benzotrifluoride to produce 4-[2′,5′-bis-carbethoxy-homogentisamido] - 2 - trifluoromethyl - aniline hydrochloride which was then diazotized and coupled with 8-acetoxy-2-naphthylamine hydrochloride. After hydrolysis, the resulting product, 8-(4′-homogentisamido-2′-trifluoromethyl) - phenylazo - 7 - amino - 1 - naphthol (Formula I) melted at 214–215° C. with decomposition.

Example 5 p-Diacetoxy-phenethyl aniline, prepared according to the method disclosed in U.S. Patent No. 3,019,254 issued Jan. 30, 1962, was diazotized and coupled with 8-acetoxy-2-naphthylamine hydrochloride according to the procedure of Example 1. The resulting product, 1-[4'-(2",5"-dihydroxyphenethyl)] - phenylazo - 2 - amino - 8 - naphthol (Formula XI) melted at 155–157° C., with decomposition.

Example 6

5 - (2',5' - dicathyloxyphenyl) - propionamido - 1-naphthylamine was diazotized and coupled with 8-acetoxy-2-naphthylamine according to the procedure of Example 1. The resulting product, 1-[5'-(2",5"-dihydroxyphenyl)-propionamido] - α - naphthylazo - 2 - amino - 8 - naphthol (Formula X), melted at 250–251° C., with decomposition.

The following nonlimiting examples illustrate another method of preparation of dye developers within the scope of this invention.

Example 7

4 - (2',5' - bis - cathyloxyphenyl) - isobutyramido - 2-trifluoromethyl-aniline hydrochloride, produced as in Example B, was diazotized and coupled according to the procedures of Example 1 with 8-acetoxy-N-methyl-2-naphthylamine hydrochloride, as prepared in Example C. The hydrolyzed product, 1-[2'-trifluoromethyl-4'-(2",5"-dihydroxyphenyl) - isobutyramido] - phenylazo - 2-methylamino-8-naphthol (Formula VII), melted at 148–150° C., with decomposition.

Example 8

4 - (2',5' - bis - cathyloxyphenyl) - propionamido-aniline hydrochloride produced by the procedure of Example B was diazotized and coupled according to the procedure of Example 1, with 8-acetoxy-2-N-isopropyl-naphthylamine hydrochloride, produce as in Example D. The hydrolyzed product, 1-[4'-(2",5"-dihydroxyphenyl)-propionamido] - phenylazo - 2 - isopropylamino - 8-naphthol (Formula XIII), melted at 124–126° C., with decomposition.

Example 9

The 2-trifluoromethyl-4-(2',5'-dicathyloxyphenyl)-propionamido-aniline hydrochloride, prepared as in Example 2, was diazotized and coupled with 8-acetoxy-2-methylamino-naphthalene hydrochloride. The hydrolyzed product was 1-[2'-trifluoromethyl - 4' - (2",5" - dihydroxyphenyl)-propionamido]-phenylazo - 2 - methylamino-8-naphthol (Formula V).

Example 10

2-chloro - 4 - (2,5-bis-cathyloxyphenyl)-propionamido-aniline hydrochloride prepared as in Example 4 was reacted according to the method of Example 1 with 8-acetoxy - 2 - methylamino-naphthalene hydrochloride. The resulting 1-[2'-chloro - 4' - (2",5"-dihydroxyphenyl)-propionamido]-phenylazo - 8 - hydroxy-2-N-methylnaphthylamine (Formula VIII), melted at 168–169° C., with decomposition.

Example 11

8 - (4' - homogentisamido - 2' - chloro) - phenylazo-7-methylamino-1-naphthol (Formula II) was prepared according to the procedure in Example 4 using as a coupler 8-acetoxy-2-methylamino-naphthalene hydrochloride.

Example 12

1-[4'-(2",5" - dihydroxyphenyl)-propionamido]-phenylazo-2-ethylamino-8-naphthol (Formula IX) was prepared by coupling 2,5-diacetoxyphenyl-propionamido-aniline hydrochloride into 8-acetoxy-2-ethylamino-naphthalene, according to the procedure of Example 1. The resulting product melted at 71–72° C.

Example 13

1-[4'-(2",5" - dihydroxyphenyl)-propionamido]-phenylazo-2-methylamino-8-naphthol (Formula XV) was prepared by diazotizing and coupling 2,5-diacetoxyphenyl-propionamido-aniline hydrochloride into 8 - acetoxy-2-methylamino-naphthalene hydrochloride and hydrolyzing. The product melted at 168–169.5° C.

Example 14

1-[4'-(2",5" - dihydroxyphenyl)-propionamido]-phenylazo-8-hydroxy - 2 - (N-β-hydroxyethyl)-naphthylamine (Formula XII) was prepared by diazotizing and coupling 2,5 - diacetoxyphenyl-propionamido-aniline hydrochloride into 8-acetoxy-2-(N-β-hydroxyethyl)-naphthylamine and hydrolyzing. The product melted at 103–150° C., and showed the following analysis for the monohydrate:

Calculated: C, 64.27; H, 5.59; N, 11.11. Found: C, 64.40; H, 5.51; N, 11.13.

The following examples of the photographic utilization of the dye developers of this invention are given for purposes of illustration only.

Example 15

1-[4'-(2",5" - dihydroxyphenyl - N - methyl-propionamido) - 2' - trifluoromethyl]-phenylazo - 8 - hydroxy-2-naphthylamine (Formula XVI) was prepared by mixing 1.34 g. (0.00372 mole) of 8-hydroxy-1-[2'-trifluoromethyl-4'-methylamino]-phenylazo-2-naphthylamine and 1.38 g. (0.004 mole) of 2,5-bis-(cathyloxy)-phenylpropionyl chloride in 50 cc. of dry pyridine and then hydrolyzing with sodium hydroxide. The product melted at 222–234° C., with decomposition.

Example 16

A photosensitive element was prepared by coating a gelatin subcoated film base with a solution comprising 0.38 gm. of 1-[4' - (2",5" - dihydroxyphenyl)-propionamido]-phenylazo - 2-methylamino-8-naphthol (Formula XV) dissolved in 10 cc. of a solution of 2% cellulose acetate hydrogen phthalate in a 50:50 mixture, by volume, of tetrahydrofuran and acetone. After this coating dried, a green-sensitive silver iodobromide was applied and allowed to dry. This photosensitive element was exposed and brought into superposed relationship with an image-receiving element as an aqueous liquid composition comprising:

| | |
|---|---|
| Water _____ cc__ | 100.0 |
| NaOH _____ gm__ | 5.17 |
| Hydroxyethyl cellulose (high viscosity commercially available from Hercules Powder Co., Wilmington, Del., under the trade name of Natrosol 250) _____ gm__ | 4.5 |
| Sodium thiosulfate _____ gm__ | 1.15 |
| Benzotriazole _____ gm__ | 2.3 |
| N-benzyl-α-picolinium bromide _____ gm__ | 2.3 | was spread between said elements. The image-receiving element comprised a 2:1 mixture, by weight, of polyvinyl alcohol and poly-4-vinylpyridine coated on a baryta paper support. After an imbition period of approximately one minute, the image-receiving element was separated and contained a magenta positive image.

Example 17

The procedure described in Example 13 was repeated except that the dye developer was dispersed in a layer of gelatin. The coating solution from which the dye developer layer was coated was prepared by adding 0.5 gm. of the dye developer in 0.5 cc. of N-n-butylacetanilide and 1.0 cc. of cyclohexanone to 5 gm. of 10% gelatin solution, 1.8 cc. of water and 1.67 cc. of 5% Alkanol B. Emulsification was effected by high speed agitation in a Waring Blendor. 5 cc. of the resulting dye dispersion was added to 10 cc. of water containing small amounts of saponin and succinaldehyde, and then coated on the gelatin subcoated cellulose acetate film base.

The use of the novel dye developers of this invention in photographic products, processes and compositions for preparing color images is described with more particularity in the aforementioned parent application, Ser. No. 174,248.

Since certain changes may be made in the above products, compositions and processes without departing from the scope of the invention herein involved, it is intended that all matter contained in the above description shall be interpreted as illustrative and not in a limiting sense.

What is claimed is:

1. A compound of the formula:

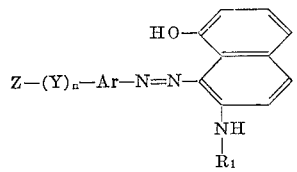

wherein Z is p-dihydroxyphenyl, Y is selected from the group consisting of lower alkylene, carboxamido, lower alkylenecarboxamido, and N-methyl lower alkylenecarboxamido, $n$ is an integer from 0 to 1, Ar is selected from the group consisting of phenylene, naphthylene, chloro-, methoxyl-, methyl-, and trifluoromethyl-substituted phenylene and naphthylene, and $R_1$ is hydrogen.

2. 8-(4'-homogentisamido-2'-trifluoromethyl)-phenylazo-7-amino-1-naphthol.
3. 1-[2'-trifluoromethyl-4'(2",5"-dihydroxyphenyl)-propionamido]-phenylazo-8-hydroxy-2-naphthylamine.
4. 1-[2'-chloro-4'(2",5"-dihydroxyphenyl)-propionamido]-phenylazo-8-hydroxy-2-naphthylamine.
5. 1-[2'-trifluoromethyl-4'-(2",5"-dihydroxyphenyl)-propionamido]-phenylazo-2-methylamino-8-naphthol.
6. 1-[4'-(2",5"-dihydroxyphenylisobutyramido)-2'-trifluoromethyl]-phenylazo-8-hydroxy-2-naphthylamine.
7. 1-[5'(2",5"-dihydroxyphenyl)-propionamido]-α-naphthylazo-2-amino-8-naphthol.
8. 1-[4'-(2",5"-dihydroxyphenethyl)]-phenylazo-2-amino-8-naphthol.

References Cited
UNITED STATES PATENTS

| | | | |
|---|---|---|---|
| 2,777,839 | 1/1957 | Bockmann et al. | 260—199 X |
| 3,134,764 | 5/1964 | Blout et al. | 260—162 |
| 3,134,765 | 5/1964 | Simon | 260—162 |
| 3,158,595 | 11/1964 | Green et al. | 260—162 |

FOREIGN PATENTS

| | | |
|---|---|---|
| 554,935 | 8/1957 | Belgium. |
| 853,479 | 11/1960 | Great Britain. |

CHARLES B. PARKER, *Primary Examiner.*

F. D. HIGEL, *Assistant Examiner.*